US006612321B1

(12) United States Patent
Ertle

(10) Patent No.: US 6,612,321 B1
(45) Date of Patent: Sep. 2, 2003

(54) DAMPING VALVE FOR POWER STEERING

(75) Inventor: Peter Ertle, Durlangen (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 0 days.

(21) Appl. No.: 09/787,589

(22) PCT Filed: Sep. 11, 1999

(86) PCT No.: PCT/EP99/06745

§ 371 (c)(1),
(2), (4) Date: Mar. 19, 2001

(87) PCT Pub. No.: WO00/17539

PCT Pub. Date: Mar. 30, 2000

(30) Foreign Application Priority Data

Sep. 18, 1998 (DE) .......................................... 198 42 840

(51) Int. Cl.⁷ ............................................... F16K 17/18
(52) U.S. Cl. .................... 137/1; 137/493.8; 137/493.9; 137/601.18
(58) Field of Search ........................... 137/493.8, 493.9, 137/1, 601.18

(56) References Cited

U.S. PATENT DOCUMENTS

| 4,298,102 | A | * | 11/1981 | Nishikawa et al. | ....... | 137/493.9 |
| 4,597,411 | A | * | 7/1986 | Lizell | ....... | 137/493.8 |
| 4,673,051 | A | * | 6/1987 | Darling et al. | ....... | 137/493.9 |
| 5,499,654 | A | * | 3/1996 | Shefte | ....... | 137/493.9 |
| 6,003,427 | A | * | 12/1999 | Asbrand et al. | ....... | 137/493.9 |

FOREIGN PATENT DOCUMENTS

| AT | 2 59 390 | 1/1965 |
| CH | 393 108 | 5/1965 |
| DE | 1 048 455 | 9/1956 |
| DE | 9 66 497 | 8/1957 |
| DE | 1 242 056 | 1/1964 |
| DE | 21 61 869 | 12/1971 |
| DE | 39 00 935 | 1/1989 |
| DE | 195 00 908 | 1/1995 |
| DE | 196 03 183 | 7/1997 |
| DE | 196 20 975 | 11/1997 |
| EP | 0 762 013 | 12/1997 |
| FR | 86 286 | 3/1961 |
| FR | 1 535 025 | 6/1968 |
| FR | 2 327 465 | 5/1977 |
| FR | 2 632 371 | 6/1989 |
| GB | 1 351 916 | 5/1974 |

* cited by examiner

Primary Examiner—Stephen M. Hepperle
(74) Attorney, Agent, or Firm—Kenyon & Kenyon

(57) ABSTRACT

In a damping valve for pressure medium-actuated operating circuits, a spring element is installed between housing, cover and counter-contour. In the opening direction, the spring element is pressed against the counter-contour by the pressure medium flowing through, so that a flow passage cross-section allowing almost unimpeded passage of the pressure medium is obtained. In the opposite direction, the throttling direction, the spring element rests on the cover and blocks the flow of the pressure medium until a well-defined pressure builds up, which lifts the inner side of the spring element from the counter-contour and thus opens a reduced flow passage cross-section.

14 Claims, 8 Drawing Sheets

DAMPING VALVE FOR POWER STEERING

FIELD OF THE INVENTION

The present invention relates to a damping valve for pressure medium-actuated operating circuits and to the use of such a damping valve in a power steering system for motor vehicles. In the damping valve, a flow passage cross-section is regulated by the interaction of housing, spring element, cover, and counter-contour.

BACKGROUND INFORMATION

In hydraulically or pneumatically actuated operating circuits, vibrations may arise which originate, for example, in the servo pump or due to impacts from a user. In power steering systems such vibrations can be generated, for example, by shocks introduced by the roadway into the steered wheels of the vehicle or into the power steering system.

French Published Patent Application No. 2 632 371 describes a damping valve which separates two pressure chambers from one another and influences the volume flow path between the two pressure chambers in a controlled manner. The damping valve has an elastic valve plate which is normally in a neutral position and, when a pressure difference arises between the two chambers, is displaced from its neutral position toward the lower pressure. A disadvantage of these damping valves is the large number of component parts and the associated large space required for installation. Another disadvantage is the fact that these nonreturn valves operate in only one direction and the damping characteristics of these valves can be influenced only to a very limited extent. French Published Patent Application No. 1 535 025 describes a damping valve for pressure medium actuated circuits having a housing and a flow-through channel between two pressure medium connections. German Published Patent Application No. 196 03 183 describes a power steering system for a motor vehicle in which damping valves are arranged in the operating lines between a control valve and the working chambers of a servo motor.

It is therefore an object of the present invention to provide a damping valve having a simple design which is versatile in its application, operates in both directions and can exhibit different damping characteristics.

The above and other beneficial objects of the present invention are achieved by providing a damping valve in which a spring element is exposed to pressure or by the flow of a medium, whereby a variable cross-sectional area can be obtained which produces the desired damping effect through variable throttle geometries, depending on the configuration. The same or different damping characteristics may be achieved in the two directions of flow.

The damping valve can be represented very simply by the interaction of a spring element and a counter-contour. The spring element is designed preferably in the form of a circular disk which can be displaced axially within a housing. Further variants include spring elements in the form of polygons or curves. The characteristics of the damping valve can be modified by variations in the spring element, the cross-section, and the counter-contour.

In order to modify the flow passage cross-section, the outer and/or inner contour of the spring element is designed so that it can move axially in relation to the contour of the housing. Along its axial extension, the contour of the housing has different cross-sections, through which the damping characteristics can be influenced.

The mobility of the outer and/or inner contour of the spring element can be achieved due to the fact that the spring element is centrally supported on the housing or on the counter-contour, and is made of an elastic material. The movable contour of such a spring element can be adjusted in an axial direction as a function of the pressure and flow conditions in the damping valve.

A damping action can be produced even for the smallest movements by pre-stressing the spring element in a controlled manner. This allows pressure to be controlled even in the case of a flat counter-contour, by the axial positioning of the spring element and variable opening cross-sections.

By specifying a free opening, for example through a bent spring element, a permanent flow can also be implemented, which allows the damping action to begin only at higher flow rates.

In the case of power steering systems of motor vehicles, undesirable vibration and noise effects, for example, can thus be suppressed.

In its simplest form, the damping valve may be manufactured as a compact unit having three parts, forming the basis for adjustable damping valves having a wide range of damping characteristics.

The free choice of housing, counter-contour and spring element even permits the creation of damping functions, i.e., the damping characteristics can be varied as a function of different parameters.

If a flow passage cross-section of the damping valve at its neutral setting is selected that is large enough to allow unimpeded passage up to a certain volume flow rate, the overall size of the damping valve can be kept small. In addition, this permits a design which is particularly insensitive to the flow rate, and thus also insensitive to noise.

There are many ways of configuring the characteristics of the damping valve. For instance, the pressure level can be raised or lowered using the adjusting screw. The increase of the slope of the pressure/volume flow curve can be modified by selection of the fit between damping element and housing.

The timing of the beginning of the damping effect can be influenced by varying the rigidity of the damping element, e.g., through the selection of the thickness of the damping element.

The use of such damping valves in power steering systems of motor vehicles is particularly advantageous, since in this case a very limited installation space is available and different types of vibration can occur, with noise effects and negative effects on the steering response which can be individually eliminated through the variability of the damping valve.

DETAILED DESCRIPTION

Figure 1:
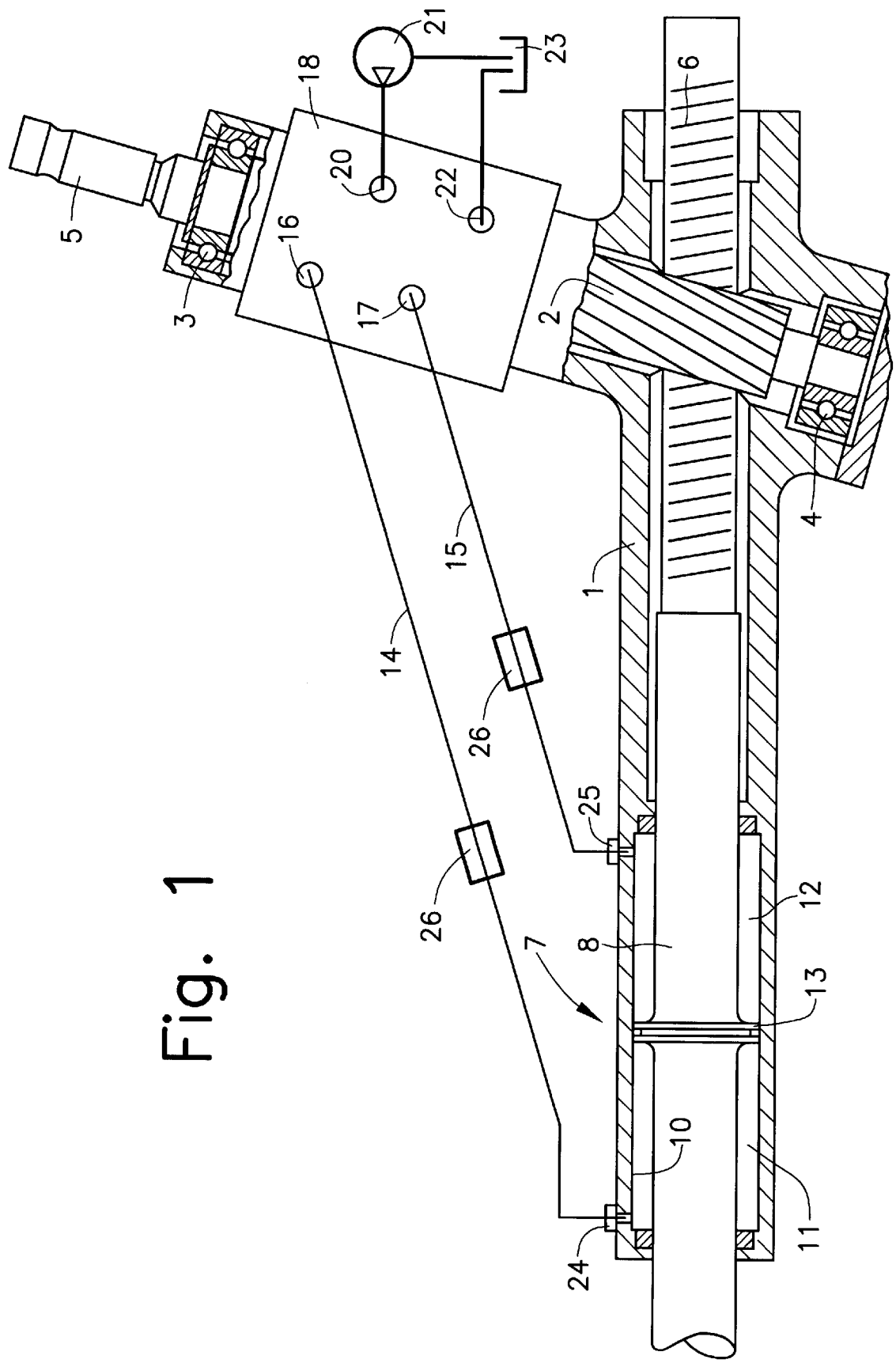
FIG. 1 is a partial longitudinal cross-sectional view of a power steering system that may be equipped with a damping valve according to the present invention.

A rack and pinion power steering system is described as one example of the application of the damping valves according to the present invention. The damping valves according to the present invention may, however, be used in any hydraulically or pneumatically supported operating circuit.

A drive pinion 2 is rotatably mounted on two bearings 3 and 4 in a steering housing 1. A steering shaft connection 5 is located at one end of drive pinion 2.

The teeth of drive pinion 2 engage with a rack 6 which is axially displaceable within the steering housing.

A servo motor with a piston rod 8 having a fixed connection to rack 6 may be used for servo support. Servo motor 7 has two working chambers 11 and 12 in a cylinder 10. These working chambers are separated from one another by piston 13 which is firmly fixed to piston rod 8. Working chambers 11 and 12 are connected via operating lines 14 and 15 to two cylinder connections 16 and 17 of a control valve 18. In addition, control valve 18 has an inlet connection 20 to which a pressure source 21 in the form of a servo pump is connected. A container 23 is connected to a return connection 22. Operating lines 14 and 15 are connected to cylinder 10 via two connecting pieces 24 and 25.

A damping valve 26 is arranged in each of the two operating lines 14 and 15 between control valve 18 and working chambers 11 and 12 of servo motor 7. Damping valves 26 may be arranged either in cylinder connections 16 and 17 on control valve 18, or in connecting pieces 24 and 25 on cylinder 10 of servo motor 7, or directly in operating lines 14 and 15.

Figure 2:
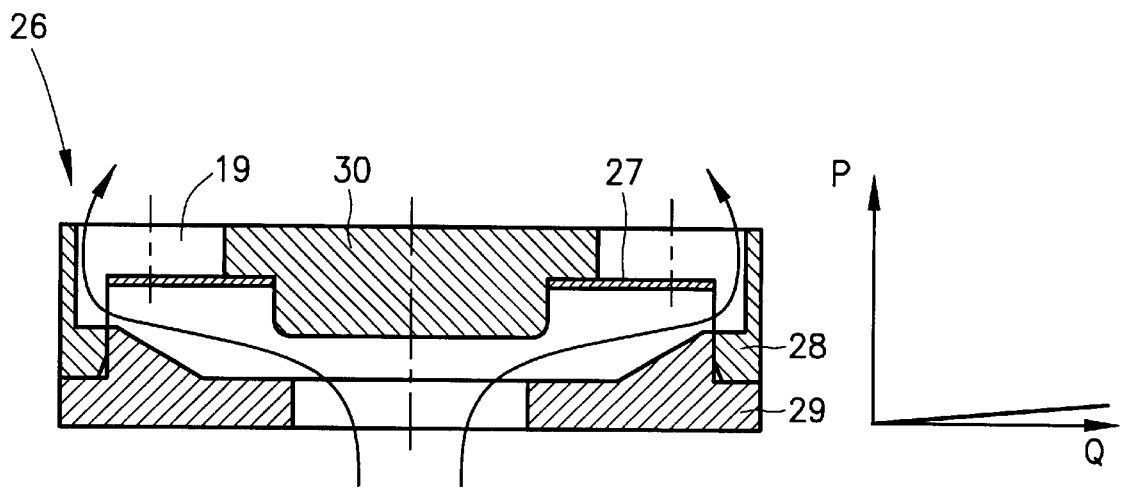
FIG. 2 illustrates an example embodiment of a damping valve according to the present invention.
Figure 2:
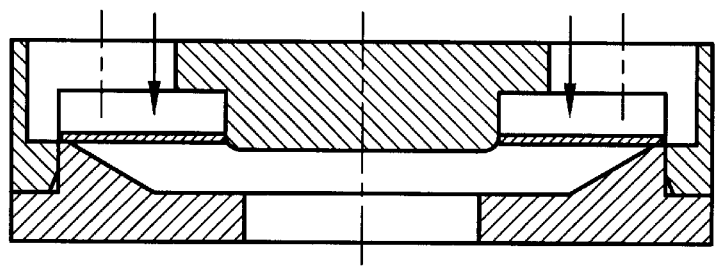
Figure 2:
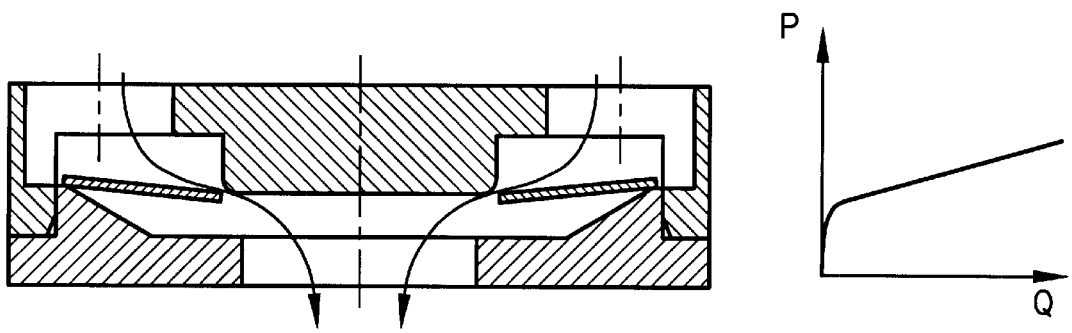

Damping valve 26 is shown in FIG. 2 in the first exemplary embodiment.

A spring element 27 is installed between housing 28, cover 29, and counter-contour 30. In the opening direction, spring element 27 is pressed toward counter-contour 30 by the pressure medium passing through, so that a flow passage cross-section is obtained which allows almost unimpeded passage of the pressure medium. In the opposite direction, the throttling direction, spring element 27 rests on cover 29 and initially blocks the flow of the pressure medium until a certain pressure has built up which lifts the inner side of spring element 27 from counter-contour 30, thus opening a reduced flow passage cross-section. Thus, in the damping direction, by the adjustment of spring element 27 and counter-contour 30 with respect to one another, a precisely defined damping pressure of damping valve 26 may be set. The curve characteristics that can be achieved using this variant show a low degree of damping in the opening direction and a high degree of damping with a function having a sharply increasing slope in the throttling direction.

Figure 3:
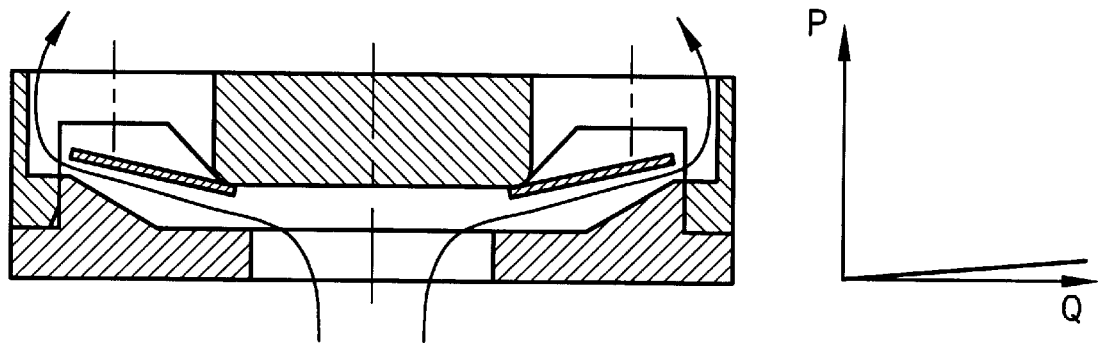
FIG. 3 illustrates another example embodiment of a damping valve according to the present invention.

The damping effect of damping valve 26 may also be influenced through the geometry of spring element 27 itself. In FIG. 3, for example, damping is achieved using a pre-bent spring element 27, which in the neutral position is not tightly closed on the outer periphery, but is in part slightly open. Thus no throttling takes place under conditions of slow, quasi-static flow. However, in the case of dynamic flow in the throttling direction, spring element 27 initially rests on its entire periphery, thus closing the flow passage cross-section. At a certain pressure level, the spring element opens on the inner side, thus allowing a damped flow of the pressure medium. The corresponding curve likewise shows a limited damping effect in the open direction, while the characteristics in the damping direction are variable. Thus, under conditions of slow flow, a slow increase in pressure occurs, whereas under conditions of fast flow, there is an abrupt increase in pressure as a function of the flow rate. Shocks and vibrations introduced by the vehicle wheels, for example, may be reduced by a sharp increase in pressure, while unpleasant sluggishness in the steering can be avoided by a slow increase in pressure with even flow rates and steering speeds.

Figure 4:
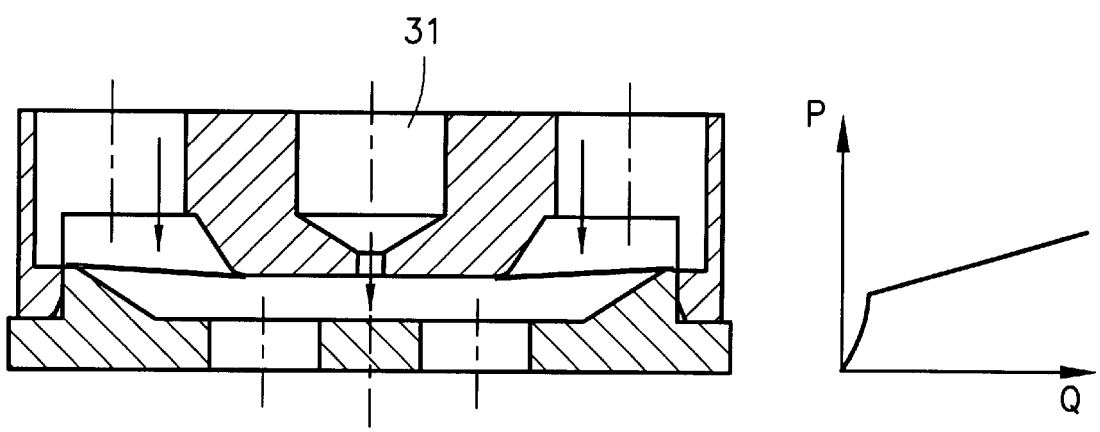
FIG. 4 illustrates another example embodiment of a damping valve according to the present invention.

As shown in FIG. 4, the curve characteristics may be influenced by an additional bore hole 31 in counter-contour 30, so that in the damping direction a parabolic increase in the slope of the pressure/flow rate curve may be obtained.

By integrating an additional valve 33 into damping valve 26, a blocking effect may be achieved, up to a certain volume flow rate, leading to an abrupt increase in the slope of the pressure/flow rate curve.

Figure 5:
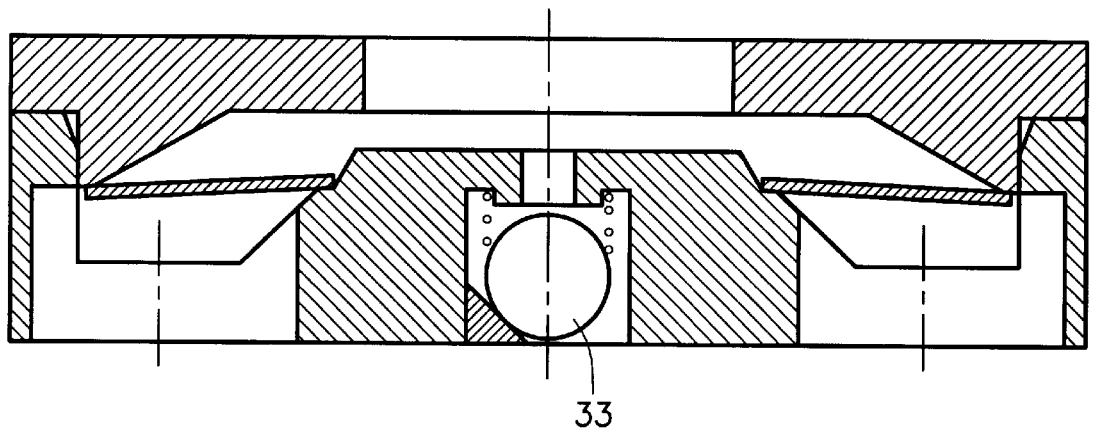
FIG. 5 illustrates another example embodiment of a damping valve according to the present invention.
Figure 6:
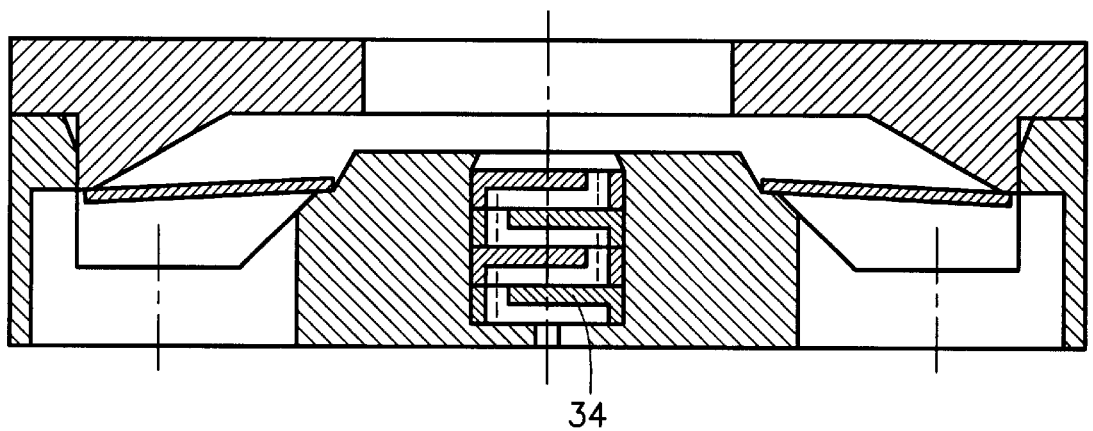
FIG. 6 illustrates another example embodiment of a damping valve according to the present invention.

If a labyrinth system 34 as illustrated in FIG. 6 is used instead of valve 33 shown in FIG. 5, dynamic effects caused by shocks introduced by the roadway can be largely throttled by the associated turbulence.

Figure 7:
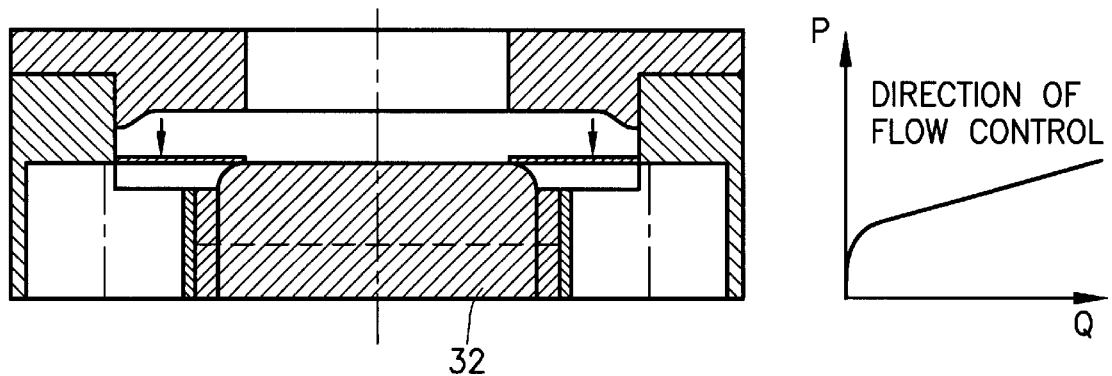
FIG. 7 illustrates another example embodiment of a damping valve according to the present invention.

In order to adapt the damping valve according to the present invention to any type of vehicle in an optimum manner, damping valve 26 may also be designed in an adjustable or switchable version. FIG. 7 shows such an embodiment. Counter-contour 30 is designed as an adjusting screw 32, which allows the pressure level of the characteristic curve of damping valve 26 to be influenced. Spring element 27 may be pre-stressed using adjusting screw 32, allowing the parameters determining the beginning of the damping effect to be influenced. A flow rate-dependent damping response can thus be obtained using adjusting screw 32.

Figure 8:
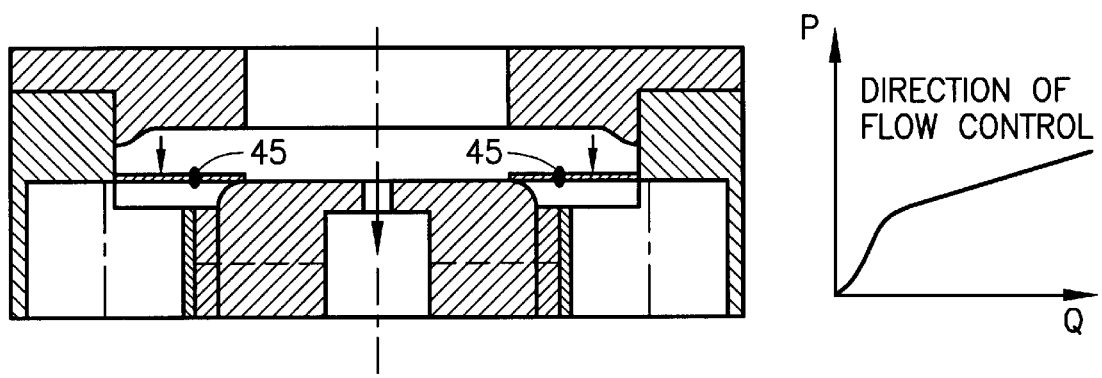
FIG. 8 illustrates an example embodiment of an adjustable damping valve according to the present invention.

FIG. 8 shows an adjustable damping valve having an additional bore hole in the adjusting screw, which allows a smoother increase in the slope of the characteristic curve to be achieved.

Figure 9:
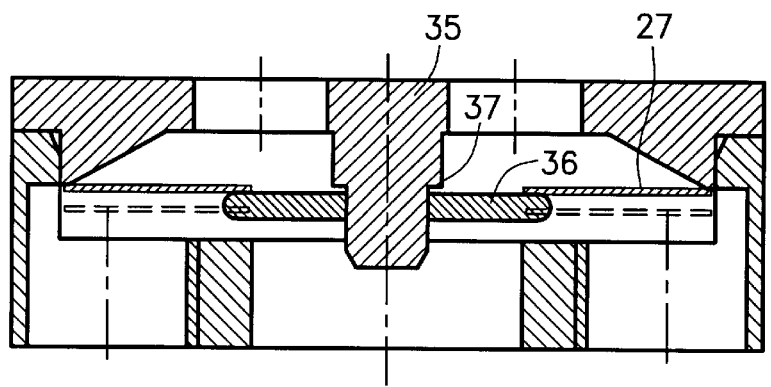
FIG. 9 illustrates an example embodiment of a damping valve having an additional switching element according to the present invention.

FIG. 9 shows an example embodiment having an additional switching element 36 designed to be movable on an extension 35. In the return direction, switching element 36 is pressed away from spring element 27, thus opening a gap for unimpeded flow. In contrast, in the throttling direction, switching element 36 is initially pushed up to a stop 37 on extension 35 and only then does it engage spring element 27 to control the variation in pressure.

Figure 10:
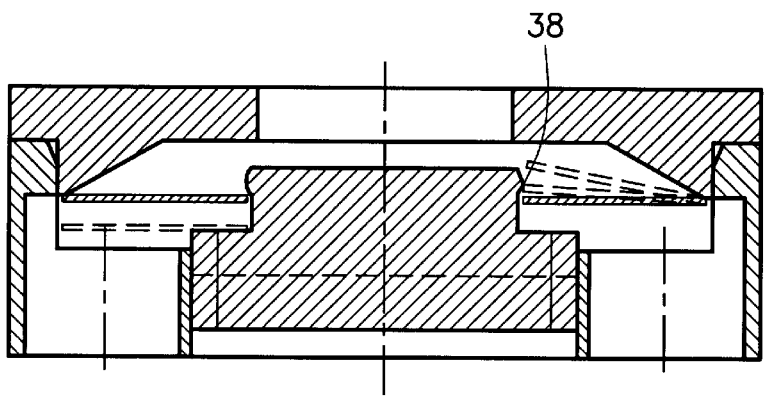
FIG. 10 illustrates another example embodiment of a damping valve according to the present invention.

In the throttling direction, a specified basic flow rate which changes with increasing volume flow rate can be set by a variable geometry 38 of adjusting screw 32, as shown in FIG. 10. The pressure/flow rate characteristics can be set as desired by varying the contour of the adjusting screw.

Figure 11:
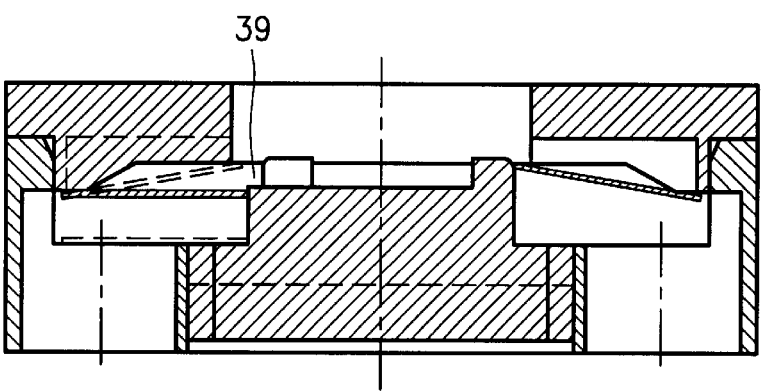
FIG. 11 illustrates another example embodiment of a damping valve according to the present invention.

Another example embodiment of the present invention is shown in FIG. 11. Adjusting screw 32, having an outer side used for guiding spring element 27, is provided with recesses 39 for the passage of flow. Spring element 27 is supported in its axial movement only at two points on cover 29, so that in the throttling direction, due to the lever effect, the pressure medium can flow past not only on the inner side of the spring element but also on the outer side.

Figure 12:
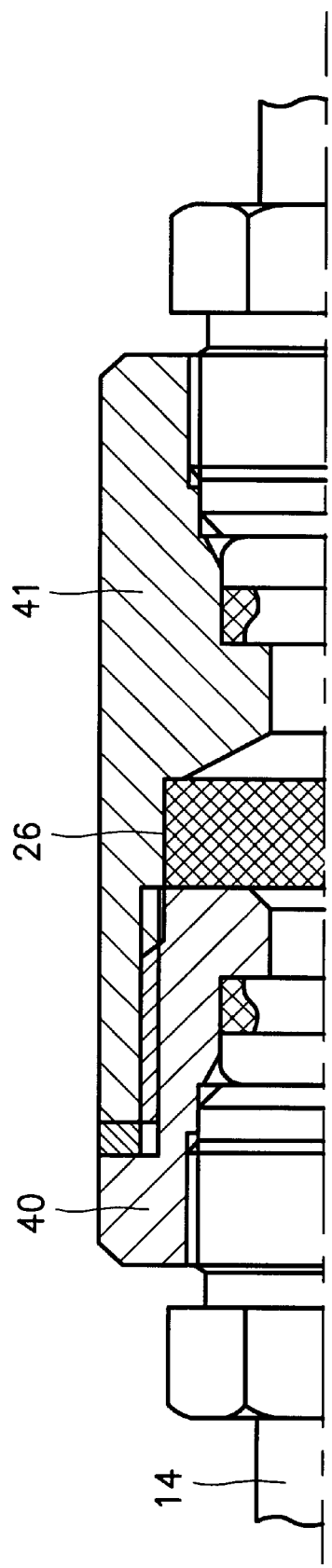
FIG. 12 illustrates an application of an example embodiment of a damping valve according to the present invention.

FIG. 12 shows an application of damping valve 26 according to the present invention. Damping valve 26 may be retrofitted into an operating line 14 using two adapters 40 and 41.

Figure 13:
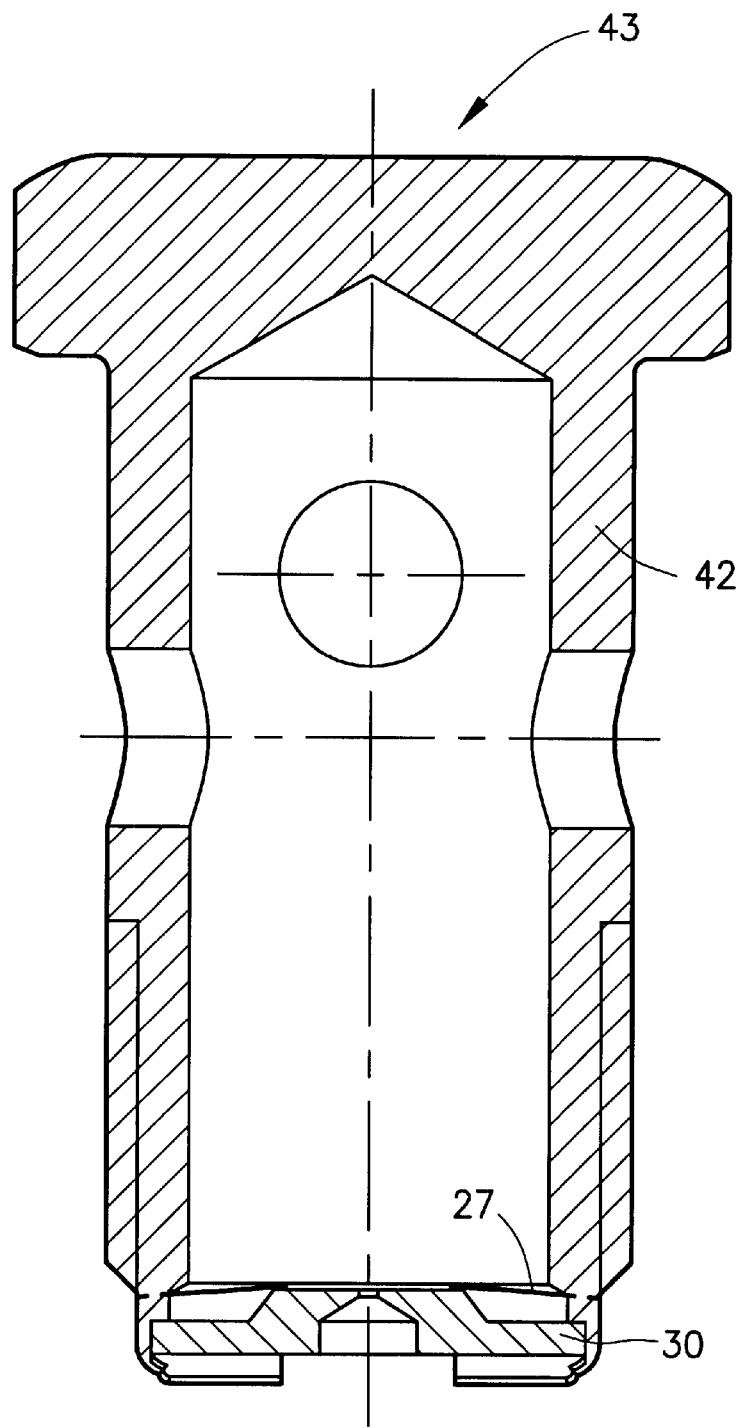
FIG. 13 illustrates another example embodiment of a damping valve according to the present invention.

FIG. 13 shows another example embodiment of damping valve 26 according to the present invention. This is a damping valve cartridge 43 which has a hollow screw 42, a spring element 27 and a counter-contour 30. The inner contour of hollow screw 46 performs the function of housing 28 and cover 29. This damping valve cartridge 43 may be easily retrofitted into motor vehicle steering systems.

The spring element 27 may include at least one throttle bore hole 45.

What is claimed is:

1. A damping valve for a pressure medium actuated operating circuit of a steering system for a motor vehicle, comprising:
   a housing;
   a first flow-through channel disposed between two pressure medium connections;
   a counter-contour; and
   a flat spring element configured to vary a cross-section of the first flow-through channel;
   wherein the spring element includes at least one central bore hole, a first one of an inner contour and an outer contour of the spring element axially movable inwardly in accordance with a first direction of flow, a second one of the inner contour and the outer contour of the spring element axially movable outwardly in accordance with a second direction of flow opposite the first direction of flow, the counter-contour including at least one bypass bore hole configured to permit the pressure medium to bypass the spring element, the at least one bypass bore hole providing a second flow-through channel between the two pressure medium connections.

2. The damping valve according to claim 1, wherein the flow-through channel cross-section is variable as a function of pressure and flow rate.

3. The damping valve according to claim 1, wherein the spring element is axially displaceable.

4. The damping valve according to claim 1, wherein the housing includes at least one throttling point.

5. The damping valve according to claim 1, further comprising an adjusting screw integrated in the housing.

6. The damping valve according to claim 5, wherein at least one throttling point is provided in the adjusting screw.

7. A damping valve for a pressure medium actuated operating circuit of a steering system for a motor vehicle, comprising:
   a housing;
   a flow-through channel disposed between two pressure medium connections;
   a counter-contour; and
   a flat spring element configured to vary a cross-section of the flow-through channel;
   an additional switching element movably arranged on an extension;
   wherein the spring element includes at least one central bore hole, the spring element axially movable inwardly and outwardly in accordance with a direction of flow, the switching element acting inwardly and outwardly in accordance with the direction of the flow, the counter-contour including at least one bore hole configured to permit the pressure medium to bypass the spring element.

8. The damping valve according to claim 5, wherein the adjusting screw includes a curve-shaped outer contour.

9. The damping valve according to claim 5, wherein the adjusting screw includes at least one recess arranged for the passage of a flow volume.

10. The damping valve according to claim 1, wherein the spring element includes at least one throttle bore hole.

11. A method of using a damping valve for a pressure medium actuated operating circuit of a steering system for a motor vehicle, the damping valve including:
   a housing;
   a first flow-through channel disposed between two pressure medium connections;
   a counter-contour; and
   a flat spring element configured to vary a cross-section of the first flow-through channel;
   wherein the spring element includes at least one central bore hole, a first one of an inner contour and an outer contour of the spring element axially movable inwardly in accordance with a first direction of flow, a second one of the inner contour and the outer contour of the spring element axially movable outwardly in accordance with a second direction of flow opposite the first direction of flow, the counter-contour including at least one bypass bore hole configured to permit the pressure medium to bypass the spring element, the at least one bypass bore hole providing a second flow-through channel between the two pressure medium connections;
   the method comprising the step of integrating the damping valve in a pressure line of the steering system, the steering system including a steering gear, a hydraulic servo motor configured to support a steering torque introduced in the steering gear, two working chambers separated by a piston, a control valve configured to control a pressure medium delivered by a pressure source to and from the two working chambers of the servo motor, the control valve being connected to the working chambers via operating lines.

12. The method according to claim 11, further comprising the step of arranging the damping valve in a cylinder connection of the control valve.

13. The method according to claim 11, further comprising the step of arranging the damping valve in a connection piece on a cylinder of the servo motor.

14. The method according to claim 11, further comprising the step arranging the damping valve in the operating line.

* * * * *